United States Patent
Cook et al.

(10) Patent No.: US 9,130,602 B2
(45) Date of Patent: Sep. 8, 2015

(54) METHOD AND APPARATUS FOR DELIVERING ENERGY TO AN ELECTRICAL OR ELECTRONIC DEVICE VIA A WIRELESS LINK

(75) Inventors: Nigel P. Cook, El Cajon, CA (US); Richard C. Levine, Dallas, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1114 days.

(21) Appl. No.: 11/654,883

(22) Filed: Jan. 17, 2007

(65) Prior Publication Data

US 2008/0014897 A1     Jan. 17, 2008

Related U.S. Application Data

(60) Provisional application No. 60/760,064, filed on Jan. 18, 2006.

(51) Int. Cl.
| | |
|---|---|
| *H04H 20/67* | (2008.01) |
| *H04W 4/00* | (2009.01) |
| *H04B 1/16* | (2006.01) |
| *H04B 1/38* | (2006.01) |
| *H04B 5/00* | (2006.01) |
| *H02J 17/00* | (2006.01) |

(52) U.S. Cl.
CPC .............. *H04B 5/0037* (2013.01); *H02J 17/00* (2013.01)

(58) Field of Classification Search
USPC ............ 455/571–574, 343.1–343.5; 370/339, 370/334; 340/286.02, 333, 109, 5.1; 320/107–108, 100–115
See application file for complete search history.

(56) References Cited

U.S. PATENT DOCUMENTS

| | | | |
|---|---|---|---|
| 3,098,971 | A | 7/1963 | Richardson |
| 3,480,229 | A | 11/1969 | Entremont |
| 3,588,905 | A | 6/1971 | Dunlavy, Jr. |
| 3,675,108 | A | 7/1972 | Nicholl |
| 3,918,062 | A | 11/1975 | Haruki et al. |
| 3,938,018 | A | 2/1976 | Dahl |
| 3,999,185 | A | 12/1976 | Polgar, Jr. et al. |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

Dudek, et al., "High permeability micro-magneto-mechanical systems," International Journal of Applied Electromagnetics and Mechanics (2007), vol. 25, pp. 103-108.

(Continued)

*Primary Examiner* — Christopher M Brandt
(74) *Attorney, Agent, or Firm* — Knobbe, Martens, Olson & Bear LLP

(57) ABSTRACT

A method and apparatus for providing power to e.g., a chargeable device via a radio frequency link. In one aspect, a method of providing power to a chargeable device via radio frequency link comprises generating a substantially un-modulated signal. The method further comprises radiating a substantially un-modulated radio frequency (RF) signal to the chargeable device via a transmit antenna based on the substantially un-modulated signal. The method further comprises powering or charging the chargeable device with power delivered by the substantially un-modulated RF signal.

24 Claims, 2 Drawing Sheets

(56) References Cited

U.S. PATENT DOCUMENTS

| | | | |
|---|---|---|---|
| 4,088,999 A | 5/1978 | Fletcher et al. | |
| 4,388,524 A | 6/1983 | Walton | |
| 4,390,924 A | 6/1983 | Nebiker, Jr. | |
| 4,473,825 A | 9/1984 | Walton | |
| 4,524,411 A | 6/1985 | Willis | |
| 4,760,394 A | 7/1988 | Takeuchi et al. | |
| 4,914,539 A | 4/1990 | Turner et al. | |
| 4,959,568 A | 9/1990 | Stokes | |
| 4,959,764 A | 9/1990 | Bassett | |
| 5,027,709 A | 7/1991 | Slagle | |
| 5,072,233 A | 12/1991 | Zanzig | |
| 5,153,583 A | 10/1992 | Murdoch | |
| 5,175,561 A | 12/1992 | Goto | |
| 5,225,847 A * | 7/1993 | Roberts et al. | 343/745 |
| 5,287,262 A | 2/1994 | Klein | |
| 5,387,818 A | 2/1995 | Leibowitz | |
| 5,396,538 A | 3/1995 | Hong | |
| 5,397,962 A | 3/1995 | Moslehi | |
| 5,400,036 A | 3/1995 | Kochiyama et al. | |
| 5,400,037 A | 3/1995 | East | |
| 5,438,699 A | 8/1995 | Coveley | |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,574,441 A | 11/1996 | Roes et al. | |
| 5,596,567 A | 1/1997 | DeMuro et al. | |
| 5,608,417 A | 3/1997 | De Vall | |
| 5,621,322 A | 4/1997 | Ehnholm | |
| 5,621,913 A | 4/1997 | Tuttle et al. | |
| 5,654,621 A | 8/1997 | Seelig | |
| 5,684,828 A | 11/1997 | Bolan et al. | |
| 5,701,121 A | 12/1997 | Murdoch | |
| 5,734,255 A | 3/1998 | Thompson et al. | |
| 5,754,948 A | 5/1998 | Metze | |
| 5,767,601 A | 6/1998 | Uchiyama | |
| 5,796,240 A | 8/1998 | Saito et al. | |
| 5,812,065 A | 9/1998 | Schrott et al. | |
| 5,821,638 A | 10/1998 | Boys et al. | |
| 5,826,178 A | 10/1998 | Owen | |
| 5,856,710 A | 1/1999 | Baughman et al. | |
| 5,936,575 A | 8/1999 | Azzarelli et al. | |
| 5,963,012 A | 10/1999 | Garcia et al. | |
| 5,966,941 A | 10/1999 | Ghoshal | |
| 5,975,714 A | 11/1999 | Vetorino et al. | |
| 5,982,139 A | 11/1999 | Parise | |
| 6,016,046 A | 1/2000 | Kaite et al. | |
| 6,028,413 A | 2/2000 | Brockmann | |
| 6,031,708 A | 2/2000 | Guermeur | |
| 6,040,680 A | 3/2000 | Toya et al. | |
| 6,040,986 A | 3/2000 | Sakamoto et al. | |
| 6,104,354 A | 8/2000 | Hill et al. | |
| 6,114,834 A | 9/2000 | Parise | |
| 6,118,249 A | 9/2000 | Brockmann et al. | |
| 6,127,799 A | 10/2000 | Krishnan | |
| 6,175,124 B1 | 1/2001 | Cole et al. | |
| 6,184,651 B1 | 2/2001 | Fernandez et al. | |
| 6,265,789 B1 | 7/2001 | Honda et al. | |
| 6,275,681 B1 | 8/2001 | Vega et al. | |
| 6,291,901 B1 | 9/2001 | Cefo | |
| 6,317,338 B1 | 11/2001 | Boys | |
| 6,321,067 B1 | 11/2001 | Suga et al. | |
| 6,337,628 B2 | 1/2002 | Campana, Jr. | |
| 6,341,076 B1 | 1/2002 | Kadatskyy et al. | |
| 6,411,824 B1 | 6/2002 | Eidson | |
| 6,437,685 B2 * | 8/2002 | Hanaki | 340/286.02 |
| 6,501,364 B1 | 12/2002 | Hui et al. | |
| 6,507,152 B2 | 1/2003 | Matsumoto et al. | |
| 6,523,493 B1 | 2/2003 | Brcka | |
| 6,556,054 B1 | 4/2003 | Goodman et al. | |
| 6,633,026 B2 | 10/2003 | Tuominen | |
| 6,636,146 B1 | 10/2003 | Wehoski | |
| 6,670,864 B2 | 12/2003 | Hyvonen et al. | |
| 6,798,716 B1 | 9/2004 | Charych | |
| 6,803,744 B1 | 10/2004 | Sabo | |
| 6,879,076 B2 | 4/2005 | Long | |
| 6,882,128 B1 | 4/2005 | Rahmel et al. | |
| 6,891,287 B2 | 5/2005 | Moret | |
| 6,912,137 B2 | 6/2005 | Berghegger | |
| 6,960,968 B2 | 11/2005 | Odendaal et al. | |
| 6,965,352 B2 | 11/2005 | Ohara et al. | |
| 6,967,462 B1 * | 11/2005 | Landis | 320/101 |
| 6,972,542 B2 | 12/2005 | Patino et al. | |
| 6,972,543 B1 | 12/2005 | Wells | |
| 7,012,405 B2 | 3/2006 | Nishida et al. | |
| 7,068,991 B2 | 6/2006 | Parise | |
| 7,076,206 B2 | 7/2006 | Elferich et al. | |
| 7,095,301 B2 | 8/2006 | Hidaka et al. | |
| 7,110,462 B2 | 9/2006 | Monsen | |
| 7,116,018 B2 | 10/2006 | Strobl | |
| 7,154,451 B1 | 12/2006 | Sievenpiper | |
| 7,164,344 B2 | 1/2007 | Deguchi et al. | |
| 7,167,139 B2 | 1/2007 | Kim et al. | |
| 7,180,265 B2 | 2/2007 | Naskali et al. | |
| 7,180,291 B2 | 2/2007 | Chmielewski et al. | |
| 7,209,792 B1 | 4/2007 | Parramon et al. | |
| 7,212,414 B2 | 5/2007 | Baarman | |
| 7,215,061 B2 | 5/2007 | Kihara et al. | |
| 7,248,165 B2 | 7/2007 | Collins et al. | |
| 7,256,532 B2 | 8/2007 | Viehland et al. | |
| 7,257,093 B1 | 8/2007 | Witzke et al. | |
| 7,262,701 B1 | 8/2007 | Nguyen | |
| 7,380,150 B2 | 5/2008 | Meier et al. | |
| 7,423,518 B2 | 9/2008 | Yamada | |
| 7,511,500 B2 | 3/2009 | Schiano et al. | |
| 7,525,283 B2 | 4/2009 | Cheng et al. | |
| 7,554,316 B2 | 6/2009 | Stevens et al. | |
| 7,598,646 B2 | 10/2009 | Cleveland | |
| 7,603,077 B2 * | 10/2009 | Onomatsu et al. | 455/3.02 |
| 7,675,197 B2 | 3/2010 | Tetlow | |
| 7,676,263 B2 | 3/2010 | Harris et al. | |
| 7,688,036 B2 | 3/2010 | Yarger et al. | |
| 7,755,552 B2 | 7/2010 | Schantz et al. | |
| 7,760,151 B2 | 7/2010 | Poilasne et al. | |
| 7,777,396 B2 | 8/2010 | Rastegar et al. | |
| 7,825,543 B2 | 11/2010 | Karalis et al. | |
| 7,839,124 B2 | 11/2010 | Yamazaki et al. | |
| 7,844,306 B2 | 11/2010 | Shearer et al. | |
| 7,868,482 B2 | 1/2011 | Greene et al. | |
| 7,885,050 B2 | 2/2011 | Lee | |
| 8,055,310 B2 | 11/2011 | Beart et al. | |
| 8,159,412 B2 | 4/2012 | Yun et al. | |
| 8,169,185 B2 | 5/2012 | Partovi et al. | |
| 8,253,278 B2 | 8/2012 | Cook et al. | |
| 8,373,514 B2 | 2/2013 | Cook et al. | |
| 8,378,522 B2 | 2/2013 | Cook et al. | |
| 8,378,523 B2 | 2/2013 | Cook et al. | |
| 2001/0012208 A1 | 8/2001 | Boys | |
| 2001/0026244 A1 | 10/2001 | Ieda et al. | |
| 2001/0029167 A1 | 10/2001 | Takeda et al. | |
| 2002/0017979 A1 | 2/2002 | Krause et al. | |
| 2002/0029797 A1 | 3/2002 | Mikami et al. | |
| 2002/0036977 A1 | 3/2002 | Lenssen et al. | |
| 2002/0057161 A1 | 5/2002 | Katsura et al. | |
| 2002/0057584 A1 | 5/2002 | Brockmann | |
| 2002/0123779 A1 | 9/2002 | Zarinetchi et al. | |
| 2002/0150065 A1 | 10/2002 | Ponnekanti | |
| 2002/0160722 A1 | 10/2002 | Terranova et al. | |
| 2002/0180584 A1 | 12/2002 | McGregor et al. | |
| 2002/0190908 A1 | 12/2002 | Andrews et al. | |
| 2003/0090353 A1 | 5/2003 | Robinson et al. | |
| 2003/0144031 A1 | 7/2003 | Ono et al. | |
| 2003/0162566 A1 | 8/2003 | Shapira et al. | |
| 2003/0174099 A1 | 9/2003 | Bauer et al. | |
| 2003/0193438 A1 | 10/2003 | Yoon | |
| 2003/0199778 A1 | 10/2003 | Mickle et al. | |
| 2003/0203733 A1 | 10/2003 | Sharon | |
| 2003/0214961 A1 | 11/2003 | Nevo et al. | |
| 2004/0001029 A1 | 1/2004 | Parsche et al. | |
| 2004/0002835 A1 | 1/2004 | Nelson | |
| 2004/0130425 A1 | 7/2004 | Dayan et al. | |
| 2004/0150521 A1 | 8/2004 | Stilp | |
| 2004/0160323 A1 | 8/2004 | Stilp | |
| 2004/0183622 A1 | 9/2004 | Gevorgian et al. | |

(56) References Cited

U.S. PATENT DOCUMENTS

| | | |
|---|---|---|
| 2004/0204781 A1 | 10/2004 | Hsien |
| 2004/0212500 A1 | 10/2004 | Stilp |
| 2004/0227002 A1 | 11/2004 | Watanabe |
| 2004/0227057 A1 | 11/2004 | Tuominen et al. |
| 2004/0227619 A1 | 11/2004 | Watanabe |
| 2005/0007239 A1 | 1/2005 | Woodard et al. |
| 2005/0017677 A1 | 1/2005 | Burton et al. |
| 2005/0029351 A1 | 2/2005 | Yoshinaga et al. |
| 2005/0043055 A1 | 2/2005 | Vance |
| 2005/0057422 A1 | 3/2005 | Deguchi et al. |
| 2005/0075697 A1 | 4/2005 | Olson et al. |
| 2005/0104457 A1 | 5/2005 | Jordan et al. |
| 2005/0125093 A1 | 6/2005 | Kikuchi et al. |
| 2005/0127867 A1 | 6/2005 | Calhoon et al. |
| 2005/0131495 A1 | 6/2005 | Parramon et al. |
| 2005/0194926 A1 | 9/2005 | Di Stefano |
| 2005/0220057 A1* | 10/2005 | Monsen ........................ 370/334 |
| 2005/0264452 A1* | 12/2005 | Fujishima et al. ..... 343/700 MS |
| 2005/0273143 A1 | 12/2005 | Kanzius et al. |
| 2006/0017438 A1 | 1/2006 | Mullen et al. |
| 2006/0032926 A1 | 2/2006 | Baba et al. |
| 2006/0061325 A1 | 3/2006 | Tang et al. |
| 2006/0071790 A1 | 4/2006 | Duron et al. |
| 2006/0094449 A1 | 5/2006 | Goldberg |
| 2006/0103355 A1 | 5/2006 | Patino et al. |
| 2006/0103506 A1 | 5/2006 | Rodgers et al. |
| 2006/0113955 A1 | 6/2006 | Nunally |
| 2006/0121639 A1 | 6/2006 | Tai et al. |
| 2006/0125703 A1 | 6/2006 | Ma et al. |
| 2006/0145659 A1 | 7/2006 | Patino et al. |
| 2006/0145660 A1 | 7/2006 | Black et al. |
| 2006/0159536 A1 | 7/2006 | Pu |
| 2006/0160517 A1 | 7/2006 | Yoon |
| 2006/0164312 A1 | 7/2006 | Mathieu |
| 2006/0176676 A1 | 8/2006 | Kuroda et al. |
| 2006/0208903 A1 | 9/2006 | Loh et al. |
| 2006/0239043 A1 | 10/2006 | Ohbo |
| 2006/0273756 A1 | 12/2006 | Bowling et al. |
| 2007/0010295 A1 | 1/2007 | Greene et al. |
| 2007/0029965 A1 | 2/2007 | Hui et al. |
| 2007/0046433 A1 | 3/2007 | Mukherjee |
| 2007/0054705 A1 | 3/2007 | Liow et al. |
| 2007/0060221 A1 | 3/2007 | Burgan et al. |
| 2007/0082611 A1 | 4/2007 | Terranova et al. |
| 2007/0087719 A1 | 4/2007 | Mandal et al. |
| 2007/0091006 A1 | 4/2007 | Thober et al. |
| 2007/0096910 A1 | 5/2007 | Waters |
| 2007/0103110 A1 | 5/2007 | Sagoo et al. |
| 2007/0103291 A1 | 5/2007 | Adams |
| 2007/0105524 A1 | 5/2007 | Fullam et al. |
| 2007/0114945 A1 | 5/2007 | Mattaboni et al. |
| 2007/0120678 A1 | 5/2007 | Posamentier |
| 2007/0126395 A1 | 6/2007 | Suchar |
| 2007/0126650 A1 | 6/2007 | Guenther |
| 2007/0135078 A1 | 6/2007 | Ljung |
| 2007/0139000 A1 | 6/2007 | Kozuma et al. |
| 2007/0145830 A1 | 6/2007 | Lee et al. |
| 2007/0146218 A1 | 6/2007 | Turner et al. |
| 2007/0156204 A1 | 7/2007 | Denker et al. |
| 2007/0164414 A1 | 7/2007 | Dokai et al. |
| 2007/0171681 A1 | 7/2007 | Baarman |
| 2007/0178945 A1 | 8/2007 | Cook et al. |
| 2007/0188326 A1 | 8/2007 | Pluss et al. |
| 2007/0205881 A1 | 9/2007 | Breed |
| 2007/0214940 A1 | 9/2007 | Stoneback |
| 2007/0222542 A1 | 9/2007 | Joannopoulos et al. |
| 2007/0229281 A1 | 10/2007 | Shionoiri et al. |
| 2007/0281625 A1 | 12/2007 | Boys |
| 2007/0285819 A1 | 12/2007 | Gerhardinger |
| 2007/0296393 A1 | 12/2007 | Malpas et al. |
| 2007/0296548 A1 | 12/2007 | Hall et al. |
| 2007/0298846 A1 | 12/2007 | Greene et al. |
| 2008/0003963 A1 | 1/2008 | Turner |
| 2008/0054638 A1 | 3/2008 | Greene et al. |
| 2008/0067874 A1 | 3/2008 | Tseng |
| 2008/0093454 A1 | 4/2008 | Yamazaki et al. |
| 2008/0093934 A1 | 4/2008 | Kato |
| 2008/0108862 A1 | 5/2008 | Jordan et al. |
| 2008/0122294 A1 | 5/2008 | Simon et al. |
| 2008/0122297 A1 | 5/2008 | Arai |
| 2008/0129147 A1 | 6/2008 | Thiesen et al. |
| 2008/0152183 A1 | 6/2008 | Janik et al. |
| 2008/0167755 A1 | 7/2008 | Curt |
| 2008/0186129 A1 | 8/2008 | Fitzgibbon |
| 2008/0191897 A1 | 8/2008 | McCollough |
| 2008/0211320 A1 | 9/2008 | Cook et al. |
| 2008/0211455 A1 | 9/2008 | Park et al. |
| 2008/0211630 A1 | 9/2008 | Butler et al. |
| 2008/0225564 A1 | 9/2008 | Bohm et al. |
| 2008/0293446 A1 | 11/2008 | Rofougaran et al. |
| 2008/0296978 A1 | 12/2008 | Finkenzeller et al. |
| 2008/0309452 A1 | 12/2008 | Zeine |
| 2008/0317274 A1 | 12/2008 | Kim |
| 2009/0002175 A1 | 1/2009 | Waters |
| 2009/0009177 A1 | 1/2009 | Kim et al. |
| 2009/0026907 A1 | 1/2009 | Davidowitz et al. |
| 2009/0045772 A1 | 2/2009 | Cook et al. |
| 2009/0051224 A1 | 2/2009 | Cook et al. |
| 2009/0052721 A1 | 2/2009 | Dabrowski |
| 2009/0058361 A1 | 3/2009 | John |
| 2009/0072627 A1 | 3/2009 | Cook et al. |
| 2009/0079268 A1 | 3/2009 | Cook et al. |
| 2009/0102296 A1 | 4/2009 | Greene et al. |
| 2009/0102419 A1 | 4/2009 | Gwon et al. |
| 2009/0109102 A1 | 4/2009 | Dokai et al. |
| 2009/0111531 A1 | 4/2009 | Cui et al. |
| 2009/0121713 A1 | 5/2009 | Van Helvoort |
| 2009/0146892 A1 | 6/2009 | Shimizu et al. |
| 2009/0167449 A1 | 7/2009 | Cook et al. |
| 2009/0171178 A1 | 7/2009 | He et al. |
| 2009/0204170 A1 | 8/2009 | Hastings et al. |
| 2009/0218884 A1 | 9/2009 | Soar |
| 2009/0243394 A1 | 10/2009 | Levine |
| 2009/0273242 A1 | 11/2009 | Cook |
| 2009/0299918 A1 | 12/2009 | Cook et al. |
| 2009/0308933 A1 | 12/2009 | Osada |
| 2010/0013434 A1 | 1/2010 | Taylor-Haw et al. |
| 2010/0068998 A1 | 3/2010 | Zyambo et al. |
| 2010/0109445 A1 | 5/2010 | Kurs et al. |
| 2010/0134366 A1 | 6/2010 | Yu |
| 2010/0176936 A1 | 7/2010 | Garber et al. |
| 2010/0277387 A1 | 11/2010 | Schantz et al. |
| 2010/0289331 A1 | 11/2010 | Shionoiri et al. |
| 2010/0289449 A1 | 11/2010 | Elo |
| 2010/0315045 A1 | 12/2010 | Zeine |
| 2011/0031821 A1 | 2/2011 | Greene et al. |
| 2011/0050166 A1 | 3/2011 | Cook et al. |
| 2011/0069516 A1 | 3/2011 | Greene et al. |
| 2011/0074349 A1 | 3/2011 | Ghovanloo |

FOREIGN PATENT DOCUMENTS

| | | |
|---|---|---|
| CN | 1237009 A | 12/1999 |
| CN | 2582188 Y | 10/2003 |
| CN | 1497768 A | 5/2004 |
| CN | 1545747 A | 11/2004 |
| CN | 1689190 A | 10/2005 |
| DE | 4023412 | 2/1992 |
| DE | 19509918 | 9/1996 |
| DE | 19729722 | 1/1999 |
| DE | 19938460 | 2/2001 |
| DE | 102004009896 | 9/2005 |
| DE | 102005053111 | 5/2007 |
| EP | 0568920 | 11/1993 |
| EP | 298707 | 9/1994 |
| EP | 724308 | 7/1996 |
| EP | 773509 | 4/2002 |
| EP | 1233547 A1 | 8/2002 |
| EP | 1302822 | 4/2003 |
| EP | 1315051 | 5/2003 |
| EP | 1003266 | 4/2006 |
| EP | 1413975 | 5/2007 |
| EP | 1892799 | 2/2008 |
| GB | 1280516 | 7/1972 |

(56) References Cited

FOREIGN PATENT DOCUMENTS

| | | |
|---|---|---|
| GB | 1343071 | 1/1974 |
| GB | 2070298 | 9/1981 |
| GB | 2318696 | 4/1998 |
| JP | S55111632 A | 8/1980 |
| JP | S55133106 A | 10/1980 |
| JP | 57032144 | 2/1982 |
| JP | S58170330 A | 10/1983 |
| JP | 62071430 A | 4/1987 |
| JP | S6312824 U | 1/1988 |
| JP | 1298901 A | 12/1989 |
| JP | H037034 A | 1/1991 |
| JP | H0449483 A | 2/1992 |
| JP | 4115606 A | 4/1992 |
| JP | H04112635 A | 4/1992 |
| JP | 04271201 | 9/1992 |
| JP | 5038232 A | 2/1993 |
| JP | H0541335 A | 2/1993 |
| JP | 05183318 | 7/1993 |
| JP | H05300663 A | 11/1993 |
| JP | 6044207 A | 2/1994 |
| JP | 06133476 | 5/1994 |
| JP | 6044207 U | 6/1994 |
| JP | 6303726 | 10/1994 |
| JP | 6327172 A | 11/1994 |
| JP | 6339232 | 12/1994 |
| JP | H07147212 A | 6/1995 |
| JP | 8033244 A | 2/1996 |
| JP | 8079976 | 3/1996 |
| JP | 8088942 | 4/1996 |
| JP | H08103039 A | 4/1996 |
| JP | 8130840 A | 5/1996 |
| JP | 8162689 A | 6/1996 |
| JP | 9037475 | 2/1997 |
| JP | 9182322 | 7/1997 |
| JP | H1069533 A | 3/1998 |
| JP | 10097931 | 4/1998 |
| JP | 10145987 A | 5/1998 |
| JP | 10225020 | 8/1998 |
| JP | H1132471 A | 2/1999 |
| JP | H1155878 A | 2/1999 |
| JP | H1197262 A | 4/1999 |
| JP | 11143600 | 5/1999 |
| JP | 11188113 A | 7/1999 |
| JP | 11191146 | 7/1999 |
| JP | H11196541 A | 7/1999 |
| JP | 11215802 A | 8/1999 |
| JP | H11220813 A | 8/1999 |
| JP | 11332135 | 11/1999 |
| JP | H11308033 A | 11/1999 |
| JP | H11345292 A | 12/1999 |
| JP | 2000078763 | 3/2000 |
| JP | 2000133542 A | 5/2000 |
| JP | 2000173825 A | 6/2000 |
| JP | 2000175379 | 6/2000 |
| JP | 2000217279 | 8/2000 |
| JP | 2000285214 A | 10/2000 |
| JP | 2001024548 A | 1/2001 |
| JP | 2001177916 A | 6/2001 |
| JP | 2001186676 A | 7/2001 |
| JP | 2001197672 | 7/2001 |
| JP | 2001238372 A | 8/2001 |
| JP | 2001264432 A | 9/2001 |
| JP | 2001326526 A | 11/2001 |
| JP | 2001526374 A | 12/2001 |
| JP | 2002017058 A | 1/2002 |
| JP | 2002078247 A | 3/2002 |
| JP | 2002508916 A | 3/2002 |
| JP | 2002152191 A | 5/2002 |
| JP | 2002163634 A | 6/2002 |
| JP | 2002290131 A | 10/2002 |
| JP | 2002320347 | 10/2002 |
| JP | 2003047177 A | 2/2003 |
| JP | 2003047178 A | 2/2003 |
| JP | 2003069335 A | 3/2003 |
| JP | 2003158651 A | 5/2003 |
| JP | 2003189507 A | 7/2003 |
| JP | 2003218624 A | 7/2003 |
| JP | 2004096262 A | 3/2004 |
| JP | 2004187429 A | 7/2004 |
| JP | 2005020231 A | 1/2005 |
| JP | 2005039756 A | 2/2005 |
| JP | 2005045298 A | 2/2005 |
| JP | 2005137040 | 5/2005 |
| JP | 2005250545 A | 9/2005 |
| JP | 2005261187 A | 9/2005 |
| JP | 2006042519 | 2/2006 |
| JP | 2006048580 A | 2/2006 |
| JP | 2006053833 A | 2/2006 |
| JP | 2006510101 A | 3/2006 |
| JP | 2006115592 A | 4/2006 |
| JP | 2006149163 A | 6/2006 |
| JP | 2006254679 A | 9/2006 |
| JP | 2006296123 A | 10/2006 |
| JP | 2006296144 A | 10/2006 |
| JP | 2006317787 A | 11/2006 |
| JP | 2006323683 A | 11/2006 |
| JP | 2007060829 A | 3/2007 |
| JP | 2007110842 A | 4/2007 |
| JP | 2007129658 A | 5/2007 |
| JP | 2007200370 A | 8/2007 |
| JP | 2007280372 A | 10/2007 |
| JP | 2008508842 A | 3/2008 |
| JP | 2009501510 A | 1/2009 |
| JP | 2010539821 A | 12/2010 |
| KR | 102000017058 | 3/2000 |
| KR | 1020010000674 | 1/2001 |
| KR | 1020010030472 | 4/2001 |
| KR | 20020064451 A | 8/2002 |
| KR | 20050016879 A | 2/2005 |
| KR | 1020050019926 | 3/2005 |
| KR | 20060070795 A | 6/2006 |
| KR | 20070017804 A | 2/2007 |
| KR | 20070048071 A | 5/2007 |
| KR | 20100083846 A | 7/2010 |
| WO | WO8807732 | 10/1988 |
| WO | 9323908 A1 | 11/1993 |
| WO | WO9619028 | 6/1996 |
| WO | 9850993 A1 | 11/1998 |
| WO | WO9857413 A1 | 12/1998 |
| WO | WO9930090 A1 | 6/1999 |
| WO | WO9950780 | 10/1999 |
| WO | WO9950806 | 10/1999 |
| WO | WO0167413 | 9/2001 |
| WO | WO02060215 | 8/2002 |
| WO | WO03077364 A2 | 9/2003 |
| WO | WO2004038887 | 5/2004 |
| WO | WO2004052563 | 6/2004 |
| WO | WO2004077550 | 9/2004 |
| WO | WO2005086279 | 9/2005 |
| WO | WO2006006636 | 1/2006 |
| WO | WO2006011769 A1 | 2/2006 |
| WO | WO2006031785 | 3/2006 |
| WO | WO2007008646 A2 | 1/2007 |
| WO | WO2007048052 | 4/2007 |
| WO | WO2007077442 | 7/2007 |
| WO | WO2007083574 A1 | 7/2007 |

OTHER PUBLICATIONS

Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 On pp. 1 Print ISBN: 978-1-4244-1848-0 INSPEC Accession No. 10394615 Digital Object Identifier: 10.1109/VPPC.2008.4677798 Date of Current Version : Nov. 18, 2008.

Karalis et al., "Efficient wireless no-rediative mid-range energy transfer", Science Direct, Annals of Physics, 323(1),34-48.(Jan. 2008). doi:10.1016/j.aop.2007.04.017.

Kim et al., "Electrically Small Magnetic Dipole Antennas With Quality Factors Approaching the Chu Lower Bound", Antennas and Propagation, IEEE Transactions on vol. 58 Issue: 6 Publication Date:

(56) References Cited

OTHER PUBLICATIONS

Jun. 2010 pp. 1898-1906 Digital Object Identifier: 10.1109/TAP. 2010.2046864.
Miranda et al.,"Wireless power transfer using weakly coupled magnetostatic resonators", Energy Conversion Congress and Exposition (ECCE), 2010 IEEE Digital Object Identifier: 10.1109/ECCE. 2010.5617728 Publication Year: 2010 , pp. 4179-4186 IEEE Conferences.
Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.
International Search Report and Written Opinion—PCT/US07/ 001529—International Search Authority, European Patent Office—Oct. 25, 2007.
Efficient wireless non-radiative mid-range energy transfer, MITpaper, publication and date unknown, believed to be 2007.
Harrist, Wireless battery charging system using radio frequency energy harvesting, Master of Science Thesis, University of Pittsburgh, 2004.
Wireless Non-Radiative Energy Transfer, MIT paper, publication and date unknown, believed to be 2007.
Wireless Power Transfer via Strongly Coupled Magnetic Resonances, Kurs et al, Science Express, Jun. 7, 2007.
Wireless Power Transfer via Strongly Coupled Magnetic Resonances, Kurs et al, scimag.org, Jul. 6, 2007.
Dong-Gi Youn et al, "A Study on the Fundamental Transmission Experiment for Wireless Power Transmission System," 1999 IEEE Conference, TENCON 99, vol. 2, pp. 1419-1422, Sep. 1999.
Finkenzeller, "RFID Handbook: Fundamentals and Applications in Contactless Smart Cards and Identification," Second Edition, Translated by Rachel Waddington, 2003, John Wiley & Sons Ltd., pp. 106-111.
McSpadden et al., "A High Conversion Efficiency 5.8 GHz Rectenna," 1997 IEEE Microwave Symposium, vol. 2, pp. 547-550, Jun. 1997.
McSpadden et al., "Theoretical and Experimental Investigation of a Rectenna Element for Microwave Power Transmission," 1992 IEEE Transactions on Microwave Theory and Techniques, vol. 40, pp. 2359-2366, Dec. 1992.
Kim et al., Switchable polymer-based thin film coils as a power module wireless neural interfaces, Sensors and Actuators, vol. A 136, Issue 1, May 2007 (available online Nov. 27, 2006), pp. 467-474.
Kurs et al., "Wireless Power Transfer via Strongly Coupled Magnetic Resonances", scimag.org, Jul. 6, 2007.
Myers et al., "A transcutaneous power transformer," Trans. Amer. Soc. Artif. Inter. Organs, vol. 14, 1968, pp. 210-219.
Shinohara et al., "Experimental Study of Large Rectenna Array for Microwave Energy Transmission," 1998 IEEE Transactions on Microwave Theory and Techniques, vol. 46, pp. 261-268, Mar. 1998.
Onizuka et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.
Schuder et al., "High Level electromagnetic energy transfer through a closed wall", Inst.Radio Engrs. Int.Conf Record 9, pp. 119-126, 1961.
Schuder,"Powering an artificial heart:Birth of the inductively coupled-radio frequency system in 1960", Artificial organs , vol. 26, No. 11, 2002, pp. 909-915.
Tae-Whan Yoo et al, "Theoretical and Experimental Development of 10 and 35 GHz Rectennas," 1992 IEEE Transactions on Microwave Theory and Techniques, vol. 40, pp. 1259-1266, Jun. 1992.
Sekitani et al., "A Large-area Wireless Power-Transmission Sheet Using Printed Organic Transistors and Plastic MEMS Switches," Nature Materials Letter, pp. 413-417; Jan. 2007.
Karalis et al., "Efficient wireless non-radiative mid-range energy transfer", MIT paper, publication and date unknown, believed to be 2007.
Karalis et al., "Wireless Non-Radiative Energy Transfer", MIT paper, publication and date unknown, believed to be 2007.
Kurs et al., "Wireless Power Transfer via Strongly Coupled Magnetic Resonances", Science Express, Jun. 7, 2007, pp. 83-86, vol. 317 No. 5834, DOI: 10.1126/science.1143254.
Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.
European Search Report—EP07716845—Search Authority—Munich—Oct. 31, 2013.
Onizuka K., et al., "Chip-to-Chip Inductive Wireless Power Transmission System for SiP Applications," Conference 2006, IEEE Custom Integrated Circuits, IEEE, Piscataway, NJ, USA, Sep. 1, 2006, pp. 575-578, XP031052537.
Ozawa, R., et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.
ATIS Telecom Glossary, available at http://www.atis.org/glossary/ definition.aspx?id=5951, retrieved on Mar. 23, 2015, 1 page.
IEEE 100 The Authoritative Dictionary of IEEE Standards Terms, Seventh Edition, the Institute of Electrical and Electronics Engineers, Inc. Published Dec. 2000, p. 121.
Japanese Office Action from corresponding Application No. 2014-124233—Mar. 16, 2015; 18 pages.
Lo E., et al., "Wireless Battery Charger" (RF/Microwave to DC Conversion), EE 198B Final Report, Dec. 2, 2005, pp. 1-20. http:// www.engr.sjsu.edu/rkwok/projects/EE198B%20-%20Wireless%20Battery%20Charger.pdf.

* cited by examiner

METHOD AND APPARATUS FOR DELIVERING ENERGY TO AN ELECTRICAL OR ELECTRONIC DEVICE VIA A WIRELESS LINK

PRIORITY AND RELATED APPLICATIONS

This application claims priority to co-owned U.S. Provisional Patent Application Ser. No. 60/760,064 entitled "Method and System for Charging an Electronic Device via a Wireless Link" filed on Jan. 18, 2006, the disclosure of which is incorporated herein by reference in its entirety. This Application is also related to, and claims priority to, U.S. patent application Ser. No. 11/408,793 entitled "Method and System for Powering an Electronic Device via a Wireless Link" filed on Apr. 21, 2006, assigned to the Assignee hereof, and which is also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to methods and apparatus for energy or power transfer, and in one aspect to wirelessly charging a portable power source, such as a battery, associated with an electronic device.

DESCRIPTION OF RELATED TECHNOLOGY

Methods and systems for the wireless transmission of power are known in the prior art, for example, U.S. Pat. No. 6,633,026 to Tuominen issued Oct. 14, 2003 and entitled "Wireless power transmission" discloses a method for wireless power transmission in a system comprising a power transmitter which in turn comprises a first light source and means for directing the light emitted by the first light source to a desired direction, and at least one power receiver comprising a first photo-detector for receiving the emitted light and for converting it into electric current. A second light source included in the power transmitter is used for transmitting light around the light emitted by the first light source and substantially parallel to it, the intensity of the light being lower than that of the light emitted by the first light source. A second photo-detector included in the power receiver is used for detecting the light emitted by the second light source and for transmitting a control signal to the power transmitter in response to a successful reception of the light emitted by the second light source. The first light source of the power transmitter is switched on in response to the reception of the control signal from the power receiver informing of the reception of the light emitted by the second light source.

U.S. Pat. No. 6,664,770 to Bartels issued Dec. 16, 2003 and entitled "Wireless power transmission system with increased output voltage" discloses a system for wireless power transmission, which makes it possible to generate an increased voltage on the receiver side using a radio signal that is optimized for this purpose and thereby permits operation particularly of digital semiconductor components in the receiver even if the receiver does not have a power supply of its own.

U.S. Pat. No. 6,999,857 to Kasper, et al. issued Feb. 14, 2006 and entitled "Data communication and power transmission system for sensing devices" discloses a wireless power transmission and communication network that provides interrogation and powering of sensors for use on undersea vehicles. The invention employs a wave-guide that allows the propagation of electromagnetic waves through a dielectric material that covers the exterior of an undersea vehicle's hull. Embedded within the dielectric material is an N dimensional array of Micro Electronic Mechanical Systems sensing devices coupled with radio frequency (RF) decoders and transceivers, and strips of conductive metal tape. Electromagnetic waves such as microwaves propagate through the dielectric material both powering the sensor network and addressing and interrogating individual sensing devices. The sensing devices take readings and then format and transmit the data results back across the wave-guide where they are received and processed by a digital processor within the hull of the undersea vehicle.

U.S. Pat. No. 7,027,311 to Vanderelli, et al. issued Apr. 11, 2006 and entitled "Method and apparatus for a wireless power supply" discloses an apparatus for a wireless power supply including a mechanism for receiving a range of RF radiation across a collection of frequencies. The apparatus includes a mechanism for converting the RF radiation across the collection of frequencies, preferably at a same time into DC. A method for a wireless power supply including the steps of receiving a range of RF radiation across a collection of frequencies. There is the step of converting the RF radiation across the collection of frequencies, preferably at a same time into DC.

U.S. Pat. No. 7,068,991 to Parise issued Jun. 27, 2006 and entitled "Remote power recharge for electronic equipment" discloses a conductorless charging and power system for electronic appliances and a method for communicating power to a power receiver employing wireless energy transmission. The remote charging system includes a power transmission unit, which transmits energy as a directional power beam, and a power receiver system that receives the transmitted energy. The power receiver system is preferably incorporated in an appliance and includes an energy receptor capable of receiving the wireless power beam and transferring the energy from the beam to an energy storage device included in the appliance: The power transmission unit receives and tracks a power request signal from the power receiver system to track the power receiver system location during energy transmission. Data streams may be incorporated into the wireless signals of the remote charging system, allowing the remote charging system to function as a communications pathway as well as a power delivery system.

United States Patent Publication No. 20060097667 to Kang, et al. published on May 11, 2006 and entitled "Wireless power supply and method of supplying power" discloses a wireless power supply and method of wirelessly supplying power using light to directly supply power wirelessly to an electrical apparatus without a power cable. The wireless power supply includes: a plurality of pressure switches adapted to switch ON/OFF in response to an applied pressure; and a plurality of light emitting devices respectively connected to the plurality of pressure switches, the plurality of light emitting devices adapted to emit light to supply the power to a load in response to at least one of the pressure switches being switched ON.

United States Patent Publication No. 20060205381 to Beart, et al. published on Sep. 14, 2006 and entitled "Adapting portable electrical devices to receive power wirelessly" discloses a wireless power receiving apparatus that is retrofitted to a portable electrical device to enable the device to receive power wirelessly. The apparatus comprises a power-receiving element adapted to be attached to the device, e.g. by adhesive, and also being adapted to receive power wirelessly from a transmitter of power when the element and transmitter are in proximity with one another. One or more power connectors are connected electrically to the power-receiving element and are adapted to be connected, when the apparatus is in use, to one or more corresponding power connectors of the portable electrical device to deliver power received by the element to the device. The power-receiving element may be in the form of a sticker or may be carried by or incorporated in a replacement cover portion for the portable electrical device.

United States Patent Publication No. 20060238365 to Vecchione, et al. published on Oct. 26, 2006 and entitled "Short-range wireless power transmission and reception" discloses a short-range wireless power transmission and reception system and methods. Power is transmitted from the electrical utility mains power supply to electrically powered appliances via electromagnetic radiation. The appliances are capable of receiving the transmitted power, converting it into electricity and storing it for subsequent use, as well as using it directly to power the appliances.

United States Patent Publication No. 20060266917 to Baldis, et al. published on Nov. 30, 2006 and entitled "Wireless Power Transmission System" discloses a method for wireless power transmission that comprises a transmitter and a receiver. The receiver does not require an independent power source and is comprised of an optical feedback to the transmitter, and therefore does not require a separate communication channel to the transmitter. The transmitter uses the optical feedback to locate and track the receiver. The transmitter can optionally employ a macro adjusters and micro adjusters that direct the beam onto the receiver for optimal power transmission. The system also optionally has a tight loop beam detector to enhance safety of the system. Either the receiver and/or the transmitter may also encode data on the energy transmission, resulting in one-way or two-way data transmission.

United States Patent Publication No. 20070010295 to Greene, et al. published on Jan. 11, 2007 and entitled "Power transmission system, apparatus and method with communication" discloses a power transmission system with communication having a base station having a wireless power transmitter, a wireless data transmission component and a first wireless data reception component. The system includes a remote station having a power harvester for converting the power from the power transmitter into direct current and a power storage component in communication with the power harvester for storing the direct current. Alternatively, the system includes a base station having a wireless power transmitter which transmits power at a frequency at which any sidebands are at or below a desired level, and a first wireless data communication component.

Recent developments in technology enable electronic devices, such as without limitation laptop or notebook computers, cell phones and PDAs (personal digital assistant) to run various multimedia or other processing-intensive applications. However, despite the foregoing wireless power transmission systems, these new multimedia applications often require a large amount of power to run, and are unable to be charged via a wireless link. In addition to the convenience associated with a wireless power transmission system, there is also a significant benefit in convenience and safety when any of such devices, for example a cell phone, is kept adequately charged without the need to connect to a powered wire. Therefore it is desired to provide an apparatus and/or system for the powering of certain electronic devices via a wireless link.

Moreover, delivery of power to electrical and electrical devices (e.g., appliances, lighting, etc.) also would allow a great degree of flexibility in terms of use and placement; e.g., a "wireless" lamp could be placed anywhere in a room without concern for tripping over wires, aesthetics, etc.

SUMMARY OF THE INVENTION

In a first aspect of the invention, apparatus for providing power to a device via a wireless link is disclosed. In one embodiment, the apparatus comprises: a transmitting antenna operative to provide power to the device via the wireless link; a sensing antenna operative to sense signals transmitted by the device; and a control unit assembly operative to control the operation of the transmitting antenna. In one variant, at least a portion of the apparatus is mounted substantially within a ceiling-mounted dome. In another variant, the power transmitted is unmodulated.

In another variant, the control unit assembly is operative to control the movement of the transmitting antenna in at least two degrees of freedom. The at least two degrees of freedom comprise a substantially azimuthal degree of freedom and a substantially elevational degree of freedom.

In another variant, the control unit is operative to charge a plurality of devices via a wireless link according to a time-division multiple access (TDMA) scheme.

In a second aspect of the invention, a method for providing power to a device via a wireless link is disclosed. In one embodiment, the method comprises: detecting a first direction for the device using a sensing antenna; directing a transmission antenna so that it can transmit at least some power in the first direction based at least in part on the act of detecting; and transmitting power from the transmission antenna via the wireless link to the device.

In a third aspect of the invention, a method for providing power to a plurality of devices via a wireless link is disclosed. In one embodiment, the power is transmitted from a transmitting antenna, and the method comprises: disposing the transmitting antenna so that power can be transmitted to the plurality of devices substantially simultaneously; and transmitting power from the transmission antenna via the wireless link to the plurality of devices according to a multiple access scheme.

In one variant, the multiple access scheme comprises a substantially time-divided scheme. In another variant, the multiple access scheme comprises a substantially frequency-divided scheme. In yet another variant, the multiple access scheme comprises a substantially frequency-hopped scheme. In still another variant, the multiple access scheme comprises a substantially code-divided scheme. As yet another alternative, the multiple access scheme comprises a sensing scheme wherein a channel is sampled before access is granted.

In a fourth aspect of the invention, apparatus for providing power to a plurality of devices via a wireless link is disclosed. In one embodiment, the apparatus comprises: a transmitting antenna configured to radiate power, the antenna further comprising apparatus allowing the antenna to selectively transmit power to the plurality of devices; a power source capable of generating the power for transmission; and a controller in signal communication with at least one of the antenna and source, the controller being adapted to cause the antenna to transmit the power to the plurality of devices according to a multiple access scheme.

In one variant, the antenna is substantially directional, and the multiple access scheme comprises a substantially time-divided scheme.

In a fifth aspect of the invention, apparatus for receiving power via a wireless link is disclosed. In one embodiment, the power is useful for providing electrical power to one or more components of the apparatus, and the apparatus comprises: a receiving antenna configured to receive power from a transmitting antenna; power source apparatus capable of storing at least a portion of the received power for subsequent use; and a controller in signal communication with at least one of the antenna and source apparatus, the controller being adapted to facilitate selective receipt of the power via the antenna. In one variant, the selective receipt comprises selective receipt according to a multiple access scheme, wherein devices other than the apparatus also receive power substantially simultaneously with the apparatus receiving power.

BRIEF DESCRIPTION OF THE DRAWINGS

The features, objectives, and advantages of the invention will become more apparent from the detailed description set forth below when taken in conjunction with the drawings, wherein.

Figure 1:
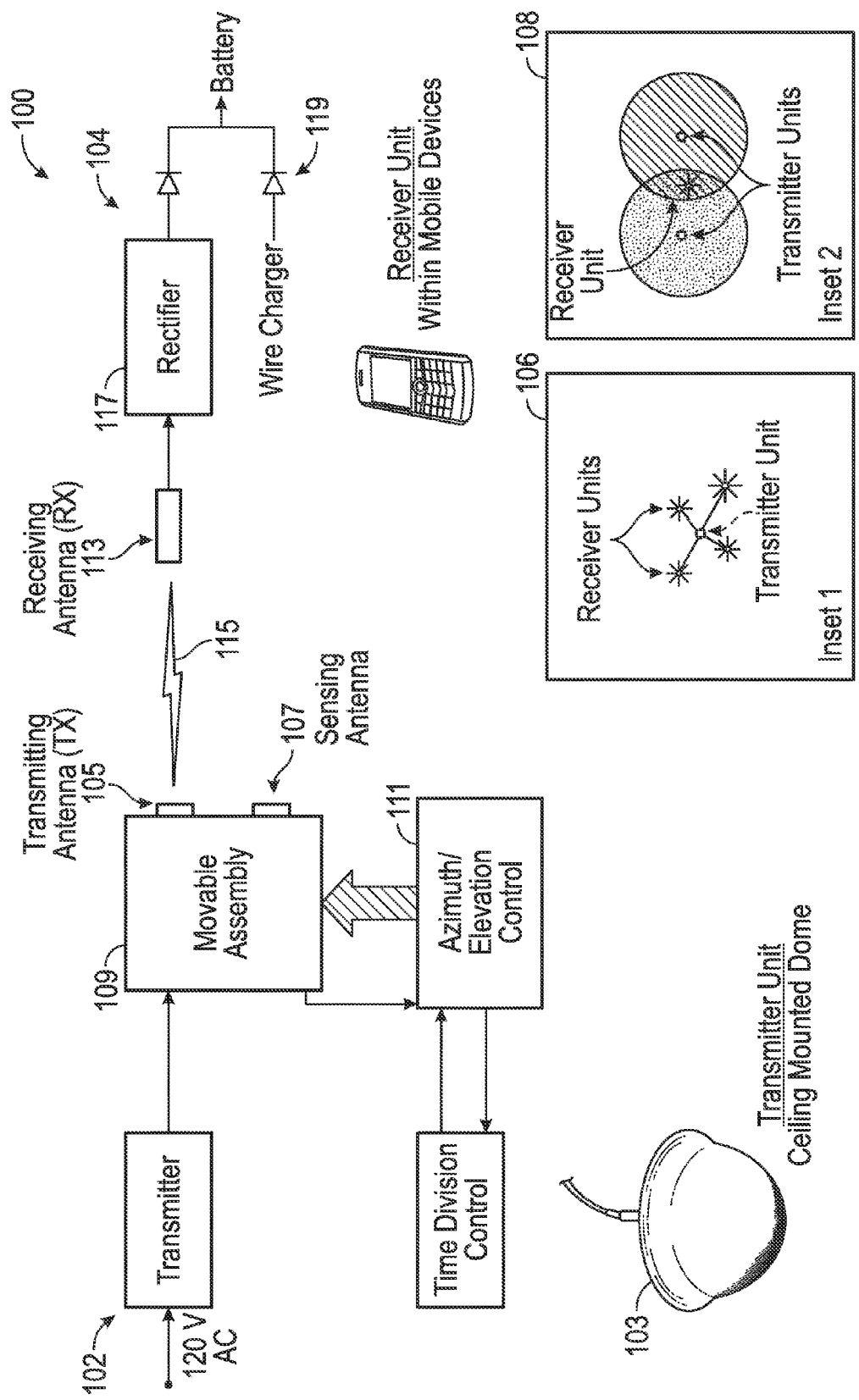
FIG. 1 illustrates at least one exemplary embodiment of a system for charging an electronic device via a wireless link.

All Figures disclosed herein are © Copyright 2006-2007 Third Option, L.L.C. All rights reserved.

DETAILED DESCRIPTION OF THE PREFERRED EMBODIMENT

Reference is now made to the drawings wherein like numerals refer to like parts throughout.

As used herein, the terms "mobile device" or "client device" include, but are not limited to, personal digital assistants (PDAs), handheld computers, personal communicators, J2ME (Java 2 Platform, Micro Edition) equipped devices, cellular telephones, smartphones, "SIP" phones, personal computers (PCs) and minicomputers, whether desktop, laptop, or otherwise, or literally any other device capable of utilizing electrical or electromagnetic power.

As used herein, the term "application" refers generally to a unit of executable software that implements a certain functionality or theme. The themes of applications vary broadly across any number of disciplines and functions (such as communications, instant messaging, content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the Java™ environment;

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the term "cellular" includes any form of cell-based mobile communications system including cellular telephones, "walkie-talkie" devices (such as those marketed by Nextel and Motorola Corporations, and so-called PTx ("push-to-anything") devices such as the exemplary PTT (push-to-talk over cellular) devices which establish and tear down SIP or other communications sessions as part of their protocol.

It will be appreciated that while the exemplary embodiments of the invention are described primarily in the context of mobile or client electronic devices, the various aspects of the present invention are in no way so limited, and in fact may be applied to other (e.g., non-mobile and/or non-electronic) devices, whether they include an electrical storage device or otherwise, including without limitation appliances, substantially fixed computer systems, televisions, lighting, and so forth.

Referring now to FIG. 1, one exemplary embodiment of a power transfer system according to the invention is described. In one embodiment, the transmitter 102 of the system may reside within, e.g., a ceiling mounted dome 103 or other such fixture, although mobile applications (e.g., in a car, truck, aircraft, etc.) are also contemplated. The receiver 104 may reside within a device that is capable of using electrical or electromagnetic power and/or wireless charging. The device may comprise, without limitation, at least one of a mobile or cellular telephone, personal data assistant (PDA), portable computer (e.g., a notebook PC), media player, a clock, an electronic display, or any other device that utilizes electric or electromagnetic power; e.g., from a portable source, such as a rechargeable battery.

Mobile devices that are turned on are considered to be active. In the example of a mobile telephone, the mobile telephone is active because it continuously or periodically communicates with its service-provider's local cell tower by, for example, exchanging a handshaking signal. It is this handshaking signal that enables the charging system's transmitter 102 to locate an exact or approximate position of the mobile device and target a concentrated charging beam at its receiver 104 to charge its battery.

In one embodiment, as shown in Inset 1 (106) of FIG. 1, multiple mobile devices within the coverage of a single transmitter 102 may be charged concurrently. In another embodiment, as shown in Inset2 (108) of FIG. 1, a single mobile device having a built-in receiver 104 may be located within the coverage of and be charged by multiple transmitters 102.

As noted above, the transmitter 102 of the exemplary embodiment is located within, for example, a ceiling dome 103 and powered by, for example, a standard 120 volts AC supply. The transmitter 102 generates signals that carry the charging energy. Signals of various waveforms including, for example, a continuous-wave (CW) single-frequency signal, a sinusoidal wave signal (no harmonics) may be used to carry and deliver the electric power to the receiver 104. In another embodiment, multiple frequency signals may be used. Also, the signal may be of any frequency and power level suitable for carrying and delivering power sufficient to charge a battery of a mobile device within a range of about 0-40 feet, and preferably within a range of 0-20 feet. One example of the signal may be a single frequency selected in the microwave band. In one embodiment, the signal may be selected with a frequency between 1 GHz-40 GHz, and preferably between 12 GHz-36 GHz. It is desirable to select the transmitter 102 to generate signals of sufficient power to charge the mobile devices wirelessly, while at the same time avoiding undesired results, such as interference with other wireless systems in the vicinity of the transmitter 102. In one embodiment, the transmitter 102 is selected to generate signals at a power level of about 1 to 50 watts. For example, the power of the transmitter 102 may be selected to communicate to a transmitting antenna 105 a signal at a power level of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 Watts. In another embodiment, signals of lower or higher power may also be used to achieve the delivery of power.

The signal from the transmitter 102 may be fed to the transmitting (TX) antenna 105, which may be omni-directional or directional. In one embodiment, it is desirable to select the TX antenna 105 as a directional antenna, e.g., with a beam-width angle between 0.1-20 degrees. For example, the beam-width angle may be selected at about 0.1, 0.2, 0.25, 0.5, 0.75, 1, 2, 3, 4, 5, 6, 7, 8, 9, 10, 11, 12, 13, 14, 15, 16, 17, 18, 19, or 20 degrees. In one embodiment, the TX antenna 105 is configured to emit a signal of about 1 degree in beam width angle, suitable for transmitting signals of frequencies within the 12 GHz to 36 GHz band. The power gain of the TX antenna 105 may be about 5, 6, 7, 8, 9, 10, 11, 12, 13, 14, 15 or 16 decibels (dB). When using a 12 decibel power gain, the TX antenna 105 may concentrate the intensity of the transmit signal by a ratio of about 16 times the power intensity relative to a unit antenna.

In one embodiment, the transmitter 102 also comprises a sensing antenna 107, which is selected to be substantially equally directional as the TX antenna 105. In one embodiment, the sensing antenna 107 is configured to be suitable for sensing signals already transmitted by a mobile device, e.g., signals of frequencies within the 800 to 1900 MHz band. It is however recognized that the sensing antenna 107 may be sensitive to receive and detect a signal in any desired frequency band. The TX antenna 105 and the sensing antenna 107 will, in one embodiment, advantageously point in substantially the same direction and be mounted on a movable assembly 109 that is configured to be adjustable in azimuth (bearing) and elevation (altitude). By pointing in substantially the same direction, the TX antenna 105 can be directed in a direction of a receiver 104 sensed by the sensing antenna 107 thereby emitting the wireless power signal in a way that optimizes power transfer efficiency between the TX antenna 105 and the RX antenna 113.

In another embodiment, the TX antenna 105 and the sensing antenna 107 can be mounted so as to operate in independent directions. The advantage of such an embodiment is that the TX antenna 105 can, for example, operate independently of the sensing antenna 107. For example, the sensing antenna 107 can advantageously operate in a scanning mode which constantly attempts to reacquire an optimized direction in which the signal emitted by the receiver 104 is maximized thereby providing updated information of e.g. the location of the receiver 104 to a control unit 111. The control unit includes in one exemplary embodiment integrated circuit components (e.g., digital processor, memory, microcontroller, etc.) used to effect control of the apparatus, e.g., according to the principles and methods described herein, such as via control logic or a computer program of the type well known in the art. The TX antenna 105 can therefore maintain a fixed position on the desired direction, while the sensing antenna 107 scans the field, until the control unit 111 informs the TX antenna 105 that the desired transmission direction has changed (e.g. due to movement of the receiver 104, etc.). In this way, the transmission direction of the TX antenna 105 can remain static while the sensing antenna 107 continues to optimize transmission direction.

Figure 2:
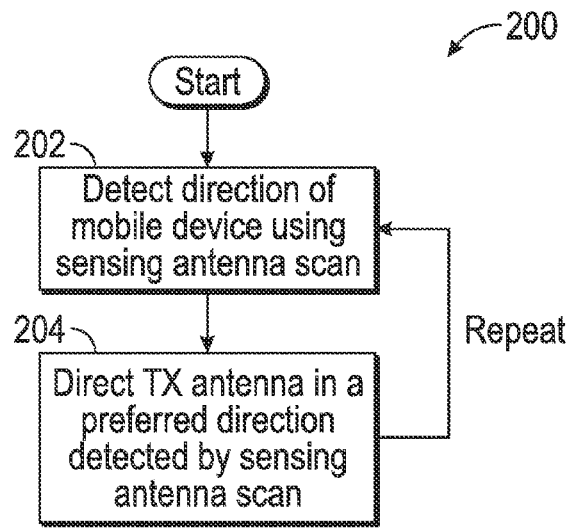
FIG. 2 is a logical flow diagram that illustrates a first exemplary method of directing power from a transmission antenna.

As previously alluded to, an azimuth/elevation control unit 111 is configured to move the assembly 109 through a search pattern, such as e.g., via the exemplary method 200 illustrated in FIG. 2. Upon detecting an active mobile device by the sensing antenna 107 (e.g., by receiving signals in the 800-1900 MHz range), the movable assembly's 109 position may be fine tuned until the sensing antenna 107 receives signals of maximum or close to a maximum received power from the mobile device in step 202. One goal that is achieved with this targeting procedure is to accurately align the TX antenna 105 to ensure that it is pointing directly at the mobile device (e.g., its receiving (RX) antenna 113), thereby achieving maximum transmit-to-receive power capture in step 204. In one embodiment, the procedure 200 may then be optionally repeated after a preset timer value has expired. In another embodiment, the procedure 200 may optionally be repeated once the received power from the mobile device detected in step 202 decreases beyond a predetermined threshold value. In yet another embodiment, the procedure 200 may optionally be repeated continuously so as to continuously reassess the proper direction for the TX antenna 105.

In one embodiment, the azimuth/elevation control unit 111 may be selected to operate in a manner similar to an infrared tracking security camera, except that the control unit 111 is configured to move the assembly 109 in response to a monitored signal (e.g., handshaking signal) received by the sensing antenna 107 instead of an infrared signal. More particularly, the control unit 111 may be configured to scan for a radio frequency signal within a desired range of frequencies (and power levels) to identify a target device for activating a charging of power via a wireless link 115. The TX antenna 105 and sensing antenna 107 can then move in tandem or move in an independent manner as described previously.

In certain embodiments, the transmitter 102 may also comprise a control unit 111 for charging multiple receivers 104 concurrently. In one embodiment, the transmitter 102 comprises a multiple access scheme (e.g., time division multiple access (TDMA)) control unit 111. The TDMA control unit 111 determines how many active mobile devices lock with the transmitter 102, and coordinates time sharing the power charging among all of the locked mobile devices. It will be appreciated, however, that other multiple access/power transfer schemes may be used consistent with the invention. For example, in one variant, a frequency-divided (e.g., FDMA) system is used, wherein different devices are provided power using different frequencies (which may be narrowband or broadband in nature). Similarly, a frequency-hopped approach can be used, wherein each device to be powered is assigned a hopping code for access to power transmitted over a plurality of frequencies.

In another variant, an approach analogous to "carrier" sense (e.g., CSMA) can be used to effectively "grab" the power delivery channel when not in use by other device, recognizing, however, that in the strict sense, there is no "carrier" per se (unless a modulation is optionally applied). In still another variant, a code-divided approach (e.g., CDMA) can be used, so that power is transmitted across a range of frequencies to multiple devices, each of the devices being configured to receive the power transmitted according to their particular spreading code. This selective reception can be accomplished by, e.g., using selective filtering, a receiver which is only sensitive to certain frequencies, or any other techniques well known in the digital communication and multiple access fields. It will be appreciated, however, that unlike the digital communications arts, the apparatus of the present invention can be utilized without modulation if desired; i.e., no data or other modulations need be encoded onto the transferred power unless desired.

Figure 3:
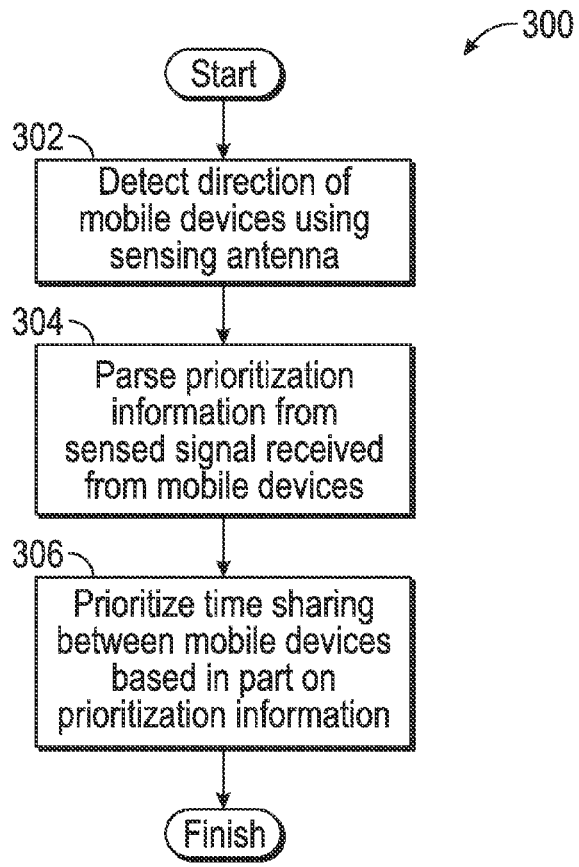
FIG. 3 is a logical flow diagram that illustrates a first exemplary method of prioritizing time sharing between a plurality of mobile devices.

Moreover, combinations of the foregoing can be used. For example, in one such possible combination, the time-divided and frequency-divided approaches are combined, such Referring now to FIG. 3, information may be detected by the sensing antenna 107 that provides information useful in prioritizing time sharing among all of the locked mobile devices using a predetermined algorithm 300. In step 302, the sensing antenna 107 may detect the direction of each of the mobile devices based on e.g. the power level of the respective signals transmitted by the mobile devices. In step 304, the control unit 111 will parse prioritization information from the signals received from each of the plurality of mobile devices. For example, the sensing antenna 107 may, in one embodiment, receive information indicative a charge level for each of the locked mobile devices. The control unit 111 may then prioritize time sharing amongst the locked mobile devices with the lowest relative charge level in step 306. In another embodiment, the sensing antenna 107 may receive information which is indicative of rate of current power consumption by each of the locked mobile devices. Hence, the control unit 111 may then prioritize time sharing amongst the locked mobile devices so that those mobile devices currently consuming the largest amount of relative power are prioritized first in the time sharing scheme. Any number of other schemes may be utilized individually or in conjunction with one another, based on available information so as to provide an efficient time sharing scheme.

The receiver 104 is configured to receive the signal from the transmitter 102 and supply the same to charge the mobile device. In certain-embodiments, the receiver 104 is built into mobile devices. The receiver 104 comprises a wireless charging receiving antenna 113 which may or may not be the same antenna that mobile devices use to communicate with the cell tower. The wireless charging receiving antenna 113 gathers as much of the beamed radio frequency energy from the transmitter 102 and delivers it to a rectifier 117. The rectifier 117 may be a Germanium-based rectifier characterized by a low barrier or threshold voltage (i.e., low on-power rectifier), to allow activation of the rectifier 117 in the event of receiving a low level signal. The rectifier 117 may also be characterized as a passive RF power sensor to minimize the use of power by the rectifier 117 from the mobile device. In one embodiment, the receiver 104 also comprises a plurality of diodes 119 (e.g., two diodes) which allow the mobile device's battery to be charged by either the wireless charging link 115 or a wired charging path.

The rectifier 117 is configured to convert the AC electrical energy from the antenna to a voltage signal, e.g., a DC voltage signal, suitable for charging the mobile device's battery. In one embodiment, a voltage regulator may be integrated with or in addition to the rectifier to regulate or limit the power supplied to the mobile device at a desired level. The voltage regulator may operate particularly when the physical movement of the mobile device causes the power of the signal received by the RX antenna 113 to vary. This variation may be due to variation in the path of the signal transmitted by the transmitter 102.

The exemplary wireless charging system 100 is configured such that sufficient energy is transmitted and delivered at the receiving antenna 113 for charging. As an illustration, a typical cell phone charger may have a maximum rating of about 4.9 volts and 450 milliamperes (mA). The power rating therefore is about 2.2 watts maximum with 1 watts optimum. For this illustration, the transmitter 102 may provide an effective charging area of, for example, 1000 square feet. In one embodiment, the transmitter 102 sends out signals of 25 watts power. The transmitting antenna 105 may be designed to be of a 12 decibel power gain thus increasing the power intensity (walls per square meter) of the radio wave so that the received signal power will be of 400 watts power (i.e., equivalent to 16.times.25 watts). Considering that a signal may be subject to a maximum of 20 dB loss over a 20 feet transmission path, a mobile device located 20 feet from the transmitting 102 may receive signals of at least 4 watts, sufficient to charge a typical mobile device. Therefore, this embodiment provides a coverage area of more than 1000 square feet.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus for providing power to a device, comprising:
   a transmitting antenna operative to wirelessly transmit power to said device via a wireless link;
   a sensing antenna operative to sense at least one power level of signals transmitted by said device; and
   a control unit assembly operative to control said transmitting antenna, said control unit assembly configured to control a direction of transmission of said transmitting antenna based on said sensed power level of said signals, both said transmitting antenna and said sensing antenna coupled to said control unit assembly.

2. The apparatus of claim 1, wherein said apparatus is mounted substantially within a ceiling-mounted dome.

3. The apparatus of claim 1, wherein said control unit assembly is operative to control a movement of said transmitting antenna in at least two degrees of freedom, wherein said at least two degrees of freedom comprise a substantially azimuthal degree of freedom and a substantially elevational degree of freedom.

4. An apparatus for providing power to a plurality of devices, comprising:
 a transmitting antenna operative to provide power to said plurality of devices via a wireless link;
 a sensing antenna operative to sense at least one power level of signals transmitted by said plurality of devices configured to detect at least one direction of at least one location of said plurality of devices from said sensing antenna; and
 a control unit assembly operative to control said transmitting antenna, both said transmitting antenna and said sensing antenna coupled to said control unit assembly, and said control unit assembly operative to charge said plurality of devices via said wireless link according to a time-division multiple access (TDMA) scheme that coordinates time sharing of power charging among said plurality of devices.

5. The apparatus as in claim 4, wherein said control unit assembly is configured to determine time divisions for charging each of said plurality of devices.

6. The apparatus as in claim 4, wherein said control unit assembly is configured to determine the order of said plurality of devices to be charged.

7. A method of providing power to a device, comprising:
 detecting a first direction of said device based on at least one power level of signals transmitted from said device using a sensing antenna;
 directing a transmitting antenna so that it can transmit more of its power in said first direction based at least in part on said detecting, said transmitting antenna and said sensing antenna being collocated; and
 transmitting substantially unmodulated power from said transmitting antenna via a wireless link to said device.

8. A method of providing power, to a plurality of devices comprising:
 adjusting a transmitting antenna based on at least one power level of signals transmitted from the plurality of devices so that said power can be transmitted to said plurality of devices substantially simultaneously; and
 transmitting said power from said transmitting antenna via a wireless link to said plurality of devices according to a substantially unmodulated signal distributed according to a multiple access scheme.

9. The method of claim 8, wherein said multiple access scheme comprises a substantially time-divided scheme.

10. The method of claim 8, wherein said multiple access scheme comprises a substantially frequency-divided scheme.

11. The method of claim 8, wherein said multiple access scheme comprises a substantially frequency-hopped scheme.

12. The method of claim 8, wherein said multiple access scheme comprises a substantially code-divided scheme.

13. The method of claim 8, wherein said multiple access scheme comprises a sensing scheme wherein a channel is sampled before access is granted.

14. An apparatus for providing power to a plurality of devices, comprising:
 a transmitting antenna configured to radiate said power, said transmitting antenna further comprising an apparatus allowing said transmitting antenna to selectively transmit said power to said plurality of devices;
 a power source configured to generate said power for transmission; and
 a controller in signal communication with at least one of said transmitting antenna and said power source, said controller being adapted to cause said transmitting antenna to transmit said power to said plurality of devices according to a substantially unmodulated signal distributed according to a Multiple access scheme, said controller configured to select said plurality of devices based on at least one power level of signals transmitted from said plurality of devices.

15. The apparatus of claim 14, wherein said antenna is substantially directional.

16. The apparatus of claim 15, wherein said multiple access scheme comprises a substantially time-divided scheme.

17. A power transmission device configured to selectively transmit power to a plurality of devices, comprising:
 a transmitting antenna configured to radiate power;
 a control unit configured to control said transmitting antenna to selectively transmit the power to said plurality of devices;
 a sense antenna configured to sense signals transmitted from said plurality of devices; and
 a power source configured to generate said power for transmission,
 said control unit configured to control transmission of said power to said plurality of devices according to a substantially unmodulated signal distributed according to at least one power level of said sensed signals, a first device and a second device of said plurality of devices configured to receive divided access to said power, and said control unit configured to prioritize said access.

18. The device as in claim 17, wherein said control unit controls transmission of said power to said plurality of devices using a time-division multiple access (TDMA) scheme that coordinates time sharing, and wherein said first device receives access at a different time than said second device.

19. The device as in claim 18, wherein said time-division multiple access (TDMA) scheme is prioritized according to power consumption.

20. The device as in claim 19, wherein devices consuming more power are prioritized first.

21. The device as in claim 18, wherein said time division is prioritized according to a current charge level of a battery being charged.

22. The device as in claim 17, wherein said control unit is configured to control transmission of said power to said plurality of devices using a frequency-division multiple access (FDMA) scheme that coordinates frequency sharing.

23. An apparatus for providing power to a device, comprising:
 means for transmitting substantially unmodulated power to said device;
 means for detecting a first direction of said device based on at least one power level of signals transmitted from said device; and
 means for directing said transmitting means based at least in part on said detecting, said transmitting means and said detecting means being collocated.

24. An apparatus for providing power to a plurality of devices, comprising:
 means for transmitting said power to said plurality of devices according to a substantially unmodulated signal distributed according to a multiple access scheme; and
 means for disposing said transmitting means based on at least one power level of signals transmitted from said plurality of devices so that said power can be transmitted to said plurality of devices substantially simultaneously.

* * * * *